United States Patent
Wang et al.

(10) Patent No.: US 9,572,080 B1
(45) Date of Patent: Feb. 14, 2017

(54) SYSTEMS AND METHODS FOR VEHICLE CONNECTIVITY CONTINUITY

(71) Applicant: Honeywell International Inc., Morris Plains, NJ (US)

(72) Inventors: Guoqing Wang, Beijing (CN); Yan Wu, Beijing (CN); Haixin Li, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/954,671

(22) Filed: Nov. 30, 2015

(51) Int. Cl.
*H04W 36/32* (2009.01)
*H04W 36/06* (2009.01)
*H04W 36/18* (2009.01)
*H04W 36/36* (2009.01)
*H04B 7/185* (2006.01)

(52) U.S. Cl.
CPC ............ *H04W 36/32* (2013.01); *H04W 36/06* (2013.01); *H04W 36/18* (2013.01); *H04W 36/36* (2013.01); *H04B 7/18508* (2013.01)

(58) Field of Classification Search
CPC .............................. H04W 36/32; H04W 64/00
USPC .................................................. 455/440–442
See application file for complete search history.

(56) References Cited

U.S. PATENT DOCUMENTS

| 7,099,665 | B2 | 8/2006 | Taylor |
| 7,187,927 | B1 | 3/2007 | Mitchell |
| 7,668,740 | B1* | 2/2010 | Baggett ............. G06F 17/30457 345/557 |
| 8,019,284 | B2 | 9/2011 | Monk |
| 8,606,266 | B1 | 12/2013 | Mitchell |
| 2006/0224318 | A1* | 10/2006 | Wilson, Jr. ........... G08G 5/0052 701/469 |

(Continued)

FOREIGN PATENT DOCUMENTS

WO 2014124753 8/2014

OTHER PUBLICATIONS

Losada et al., "The Next Broadband Frontier: Airborne Satellite Platforms", "Milsat Magazine", May 2011, pp. 1-4, Publisher: Hughes Network Systems LLC, Published in: US.

(Continued)

*Primary Examiner* — Michael T Vu
(74) *Attorney, Agent, or Firm* — Fogg & Powers LLC

(57) ABSTRACT

Systems and methods for vehicle connectivity continuity are provided. In one embodiment, a vehicle communication system comprises: a first radio communication device having a predictive availability function, wherein the predictive availability function comprising an input configured to receive time correlated trajectory data for a planned route for a vehicle; and an attitude control model coupled to the predictive availability function, wherein the attitude control model generates and outputs predictions of vehicle attitude for a plurality of route positions defined along the planned route; wherein the predictive availability function generates a blockage schedule of predicted signal blockages of channels utilized by the communication device based on the predictions of vehicle attitude for the plurality of route positions; wherein the first radio communication device is configured to transfer between a first communication channel and a second communication channel at a predetermined position along the planned route based on the blockage schedule.

20 Claims, 5 Drawing Sheets

(56) References Cited

U.S. PATENT DOCUMENTS

2013/0079964 A1* 3/2013 Sukkari .............. G01C 21/3697
701/22
2013/0138338 A1 5/2013 Behara et al.

OTHER PUBLICATIONS

Viasat, "New Dual-Band KU/KA Terminal Enables In-Flight Network Switching Across Commercial KU- and KA-Band Satellite Networks", "https://www.viasat.com/news/new-dual-band-kuka-terminal-enables-flight-network-switching-across-commercial-ku-and-ka-band", Oct. 8, 2015, pp. 1-3, Published in: US.

* cited by examiner

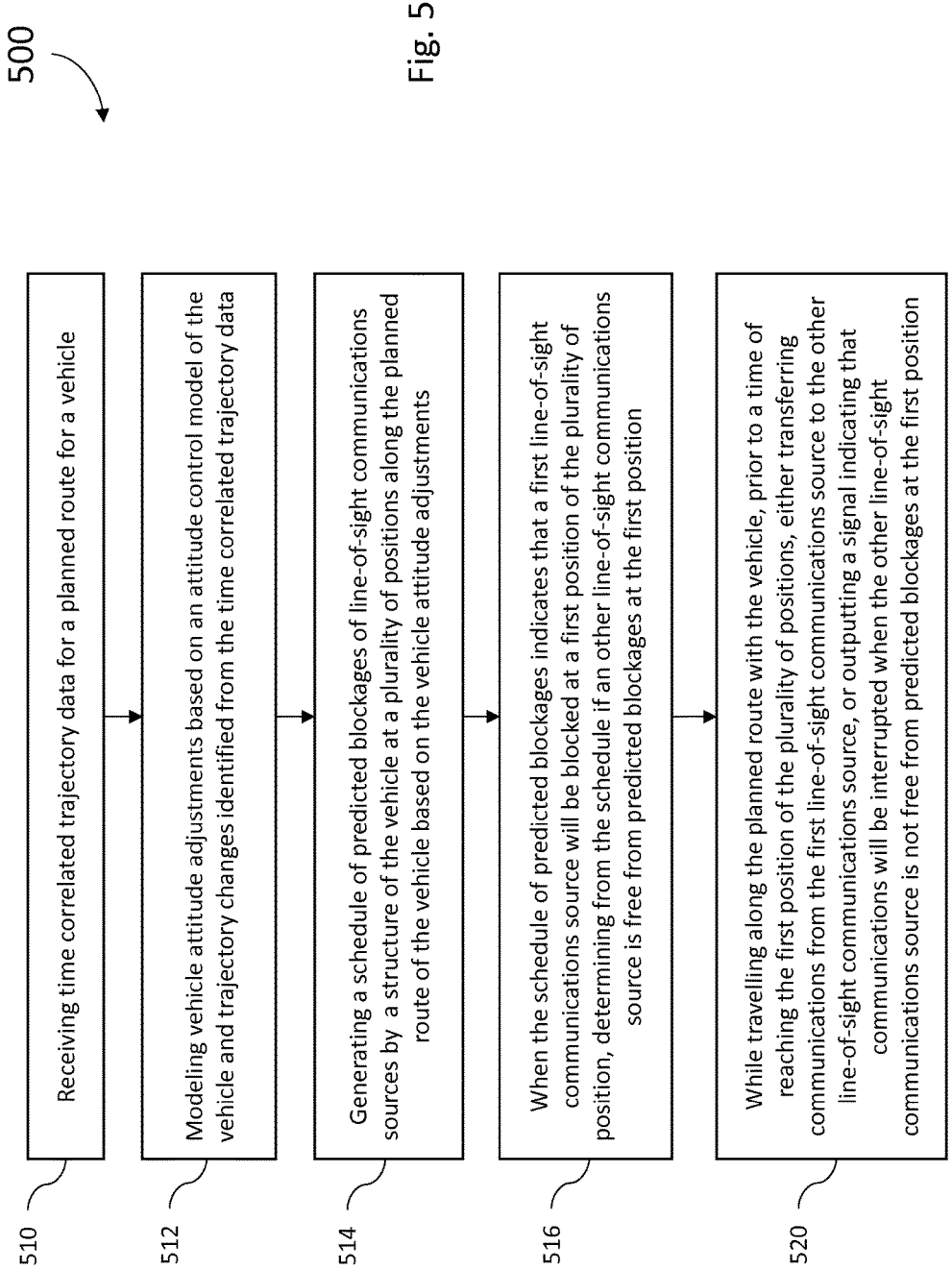

US 9,572,080 B1

SYSTEMS AND METHODS FOR VEHICLE CONNECTIVITY CONTINUITY

BACKGROUND

Radiation from a vehicle mounted line-of-sight radio communications antenna, for example a SATCOM antenna, may be blocked by vehicle structures in certain directions, dependent on the vehicle type and the location of the antenna. The scattering of the signal due to structural blockage may lead to non-compliant radiation causing interruptions in services relying on that communications link. The connectivity may be interrupted intermittently or possibly continuously when the vehicle's trajectory or attitude results in an extended structural blockage.

For the reasons stated above and for other reasons stated below which will become apparent to those skilled in the art upon reading and understanding the specification, there is a need in the art for alternate systems and methods for providing vehicle connectivity continuity.

SUMMARY

The Embodiments of the present invention provide methods and systems for providing vehicle connectivity continuity and will be understood by reading and studying the following specification.

In one embodiment, a vehicle communication system comprises: a first radio communication device having a predictive availability function, wherein the predictive availability function comprising an input configured to receive time correlated trajectory data for a planned route for a vehicle; and an attitude control model coupled to the predictive availability function, wherein the attitude control model generates and outputs predictions of vehicle attitude for a plurality of route positions defined along the planned route; wherein the predictive availability function generates a blockage schedule of predicted signal blockages of channels utilized by the first radio communication device based on the predictions of vehicle attitude for the plurality of route positions defined along the planned route; wherein the first radio communication device is configured to transfer between a first communication channel and a second communication channel at a predetermined position along the planned route based on the blockage schedule.

DRAWINGS

Embodiments of the present invention can be more easily understood and further advantages and uses thereof more readily apparent, when considered in view of the description of the preferred embodiments and the following figures in which:

FIG. 5 is a flow chart illustrating a method of one embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure use time correlated planned routes along with vehicle specific blockage data to predict when one or more portions of the structure of a vehicle will be positioned between a vehicle mounted radio frequency (RF) antenna and a communication source (for example, a satellite) with which the vehicle is actively communicating. Based on these predictions of signal blockages, alternative communications resources may be activated prior to the occurrence of actual signal degradations to ensure either smooth handoffs or, if necessary, notifications provided before impending connectivity losses occur. In fact, a pre-flight channel selection schedule can be generated and correlated to the time correlated trajectory data based on a blockage schedule well before the vehicle departure.

Figure 1:
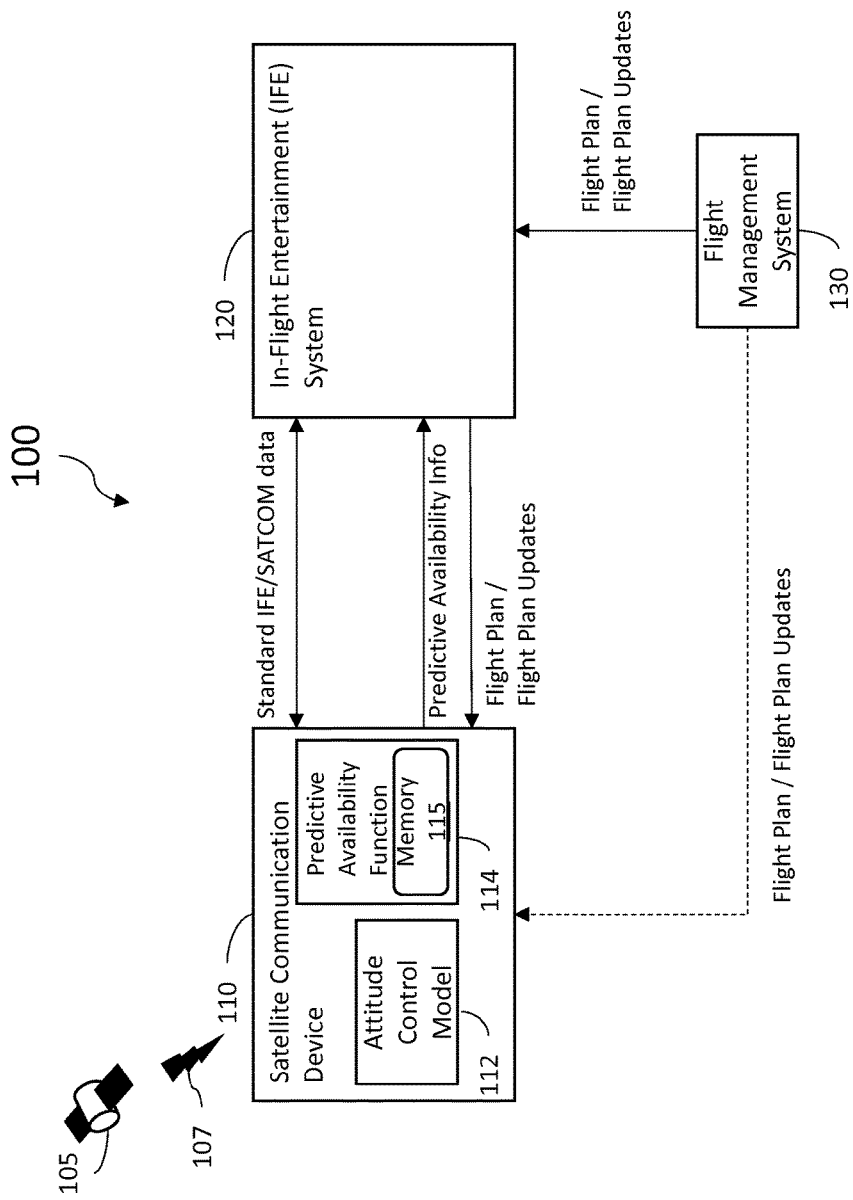
FIG. 1 is a diagram illustrating a communication system of one embodiment of the present disclosure.

FIG. 1 is a block diagram illustrating a signal blockage mitigating communications system 100 of one embodiment of the present disclosure. Although communications system 100 is described by way of example as an avionics system aboard an aircraft, it should be appreciated that communications system 100 may be implemented in other vehicles that travel along a time correlated planned route. At the terms are used herein, a "time correlated" planned route, or "time correlated" trajectory data for a planned route, refers to route plans that specify the path a vehicle is expected to travel in three-dimensional space (heading/track data and vertical plan profile), as well at the points in time at which the vehicle is expected to be at a given waypoint along the path. For example, in some implementations, the time correlated planned route comprises a time correlated flight plan that indicates every turn or other maneuver an aircraft is planned to make, and tracks the aircraft's progress along a planned trajectory with altitude and speed constraint and the expected time to a given waypoint. In some aircraft implemented embodiments, the flight plan may be based on a 4D-TBO ("4-Dimensional Trajectory Based Operation") Air Traffic Management (ATM) protocol. Also, although satellite communication devices are provided as examples, other embodiments with other radio communications technologies incorporated are envisioned as within the scope of the present disclosure such as, but not limited to air-to-ground (ATG) radio, Aero MACS communications, 3G or 4G cellular networks, or NAVCOM avionics radio devices. With respect to Satellite Communications (SATCOM), various implementations may comprise, but are not limited to Ka, Ku, or L, Iridium devices or combinations thereof.

In the particular embodiment illustrated in FIG. 1, system 100 comprises a satellite communications device 110, an in-flight entertainment system 120 and a flight management system 130. In-flight entertainment system 120 is coupled to the satellite communication device 110 (shown by 122) to establish a data link 107 with one or more satellite constellations 105 to establish cabin data services for passengers travelling on the aircraft. Cabin data services may include, but are not limited to, voice communications connectivity, Internet connectivity, or other connectivity via other data exchange service. In this embodiment, in-flight entertainment system 120 also is coupled to the aircraft's flight management system 130 and receives flight plan and flight plan updates (collectively "flight plan data") from the flight management system 130, which includes a time correlated flight plan that comprises time correlated trajectory data for a planned flight route. In one embodiment the flight plan data comprises 4D-TBO protocol data. The flight plan data is provided to a predictive availability function 114 of the satellite communication device 110 for the purpose of predicting line-of-sight blockages that will interfere with the connectivity between one or more satellites of constellation 105 and the satellite communication device 110. In some embodiments, the predictive availability function 114 and/or the satellite communication device 110 may alternately be coupled to the flight management system 130 and receives the flight plan data directly from the flight management system 130.

Satellite communication device 110 comprises the predictive availability function 114 discussed above and also an attitude control model 112. Given the time correlated trajectory data, the attitude control model 112 generates and outputs a prediction of aircraft attitude for each flight segment and for each aircraft trajectory transition or maneuver defined in the flight plan data. In modern aircraft, a digitalized flight control system may host aircraft control laws, will guide an aircraft in a predictable manner, and provide automations for trajectory changes that are extensively used in normal flight operation.

For example, when the flight plan data includes time correlated trajectory data indicating a course change to the left by 70 degrees is planned at 1 hour 15 minutes into a flight, the attitude control model 112 may predict that the aircraft will experience a 10 to 15 degrees bank angle to the left during the maneuver while turning at a standard rate of 3 degrees per second. In another maneuver performed to carry out a different course change defined by the time correlated trajectory data to occur at 1 hour 30 minutes into the flight, the attitude control model 112 may predict that the aircraft will lower its nose by 10 degrees while decreasing thrust.

In one implementation of the embodiment of FIG. 1, the attitude control model 112 comprises a simplified or a generic control model for the aircraft or category of aircraft, which characterizes how the aircraft maneuvers in response to given flight plan control inputs. That is, because attitude control model 112 does not actually in any way control aircraft flight in this embodiment, it is not necessary for it to be as sophisticated as a control module that does. For example, rather than being optimized for highly accurate predictions, attitude control model 112 may be optimized to predict worst case blockage attitudes. In other implementations, the attitude control model 112 may be optimized to provide attitude predictions that attempt to replicate those of the aircraft flight control system's control model. In still other implementations, the attitude control model 112 is realized outside the satellite communication device 110 (for example, in the flight management system 130 or other avionics system such as the Flight Control System) and the predictive availability function 114 may query attitude control model 112 for the attitude predictions (for example, via the flight management system 130 or other avionics system such as the Flight Control System).

Given the data provided by the attitude control model, the predictive availability function 114 can correlate a blockage schedule that includes predicted aircraft attitudes for the various maneuver points and segments or legs of flight along the planned flight route by correlating the predicted aircraft attitudes with the time correlated flight data. Using these aircraft attitude predictions, the predictive availability function 114 predicts when during the flight the orientation of the aircraft will cause some physical component of the aircraft structure to come between the antenna of the satellite communication device 110 and the current position of a given line-of-sight communications source (i.e., a particular satellite of constellation 105) causing an interruption in connectivity. In one implementation, the predictive availability function 114 includes a database, table, or some other physical data storage component (shown as memory 115) that stores aircraft specific blockage data. For example, an aircraft's vertical tail plane, horizontal tail plane, wing, winglet and forward fuselage are all examples of aircraft structure that can create signal blockage that will interfere with connectivity between the satellite communication device 110 and a satellite of constellation 105. Accordingly, the stored aircraft specific blockage data accessible to the predictive availability function 114 describes the aircraft geometry specific for that aircraft including for example, aircraft structures, and airframe type, and antenna locations on the fuselage.

As mentioned above, the location of a light-of-sight communication source, such as a satellite, is not necessarily static. Therefore, in addition to generating a schedule that correlates that aircraft's predicted attitude along the planned flight plan, the predictive availability function 114 also includes satellites ephemeris information for each satellite it utilizes and correlates that information for points along the time correlated flight plan as well. Together with the aircraft blocking data, the satellites' ephemeris information, and predicted aircraft attitudes correlated to the time correlated flight plan, signal blockages may be predicted by the predictive availability function 114 long before the aircraft maneuver occurs, thus avoiding or mitigating connectivity truncations and providing an improved experience for users of the connectivity sensitive services. The predicted signal blockages may then be stored in a blockage schedule that is aligned in time with the time correlated flight plan. For flights that require no deviations from their original flight plans, signal blockages may be predicted early, even before the vehicle departure commences, and alternate data link service activations scheduled to avoid or minimize connectivity interruptions. That is, a pre-flight channel selection schedule can be generated and correlated to the time correlated trajectory data based on a blockage schedule well before the vehicle departure. If in-flight deviations are necessary from the original flight plan, signal blockage predictions can be updated by sending the revised correlated flight plan data to the predictive availability function as soon as the change is confirmed with the aircraft's flight management system 130.

In one embodiment in operation, the predictive availability function 114 monitors the progress of the aircraft along the planned flight path by keeping track of the current elapsed time of the flight. Prior to reaching a planned maneuver or flight segment where signal blockage of an in-service data link is predicted to occur (e.g., based on the pre-calculated blockage schedule) the predictive availability function 114 initiates establishment of a new data link with a second satellite in constellation 105 that will not have a blocked signal during that period of time. Handoff to the second satellite is performed before connectivity due to the predicted signal blockage is lost. If no alternative connection channel is available or a lower connection speed is expected due to the service transition, the potential connectivity degradation can be well predicted upon the receipt of flight plan or changes to the plan. In one embodiment, the predictive availability function 114 outputs predictive availability information to the in-flight entertainment system 120 (or other on-board system) indicating an impending service degradation or loss so that passengers using the services may plan accordingly.

In certain configurations, it is possible to have more than one available communication satellite at the moment system 100 is establishing communication, and use of a specific satellite is often selected based on desirable signal characteristics. However, the best signal quality satellite doesn't necessarily provide consistent connectivity due to the mobility of the carrying vehicle, satellite provides second best signal quality may be able to maintain continuous service, depend on the flight path, fuselage and attitude control. As such, in some embodiments, based on the blockage schedule developed by the predictive availability function 114, satellite communications device 110 will select satellites based on signals that meet at least a minimum threshold without blockages throughout a given flight segment.

Figure 2:
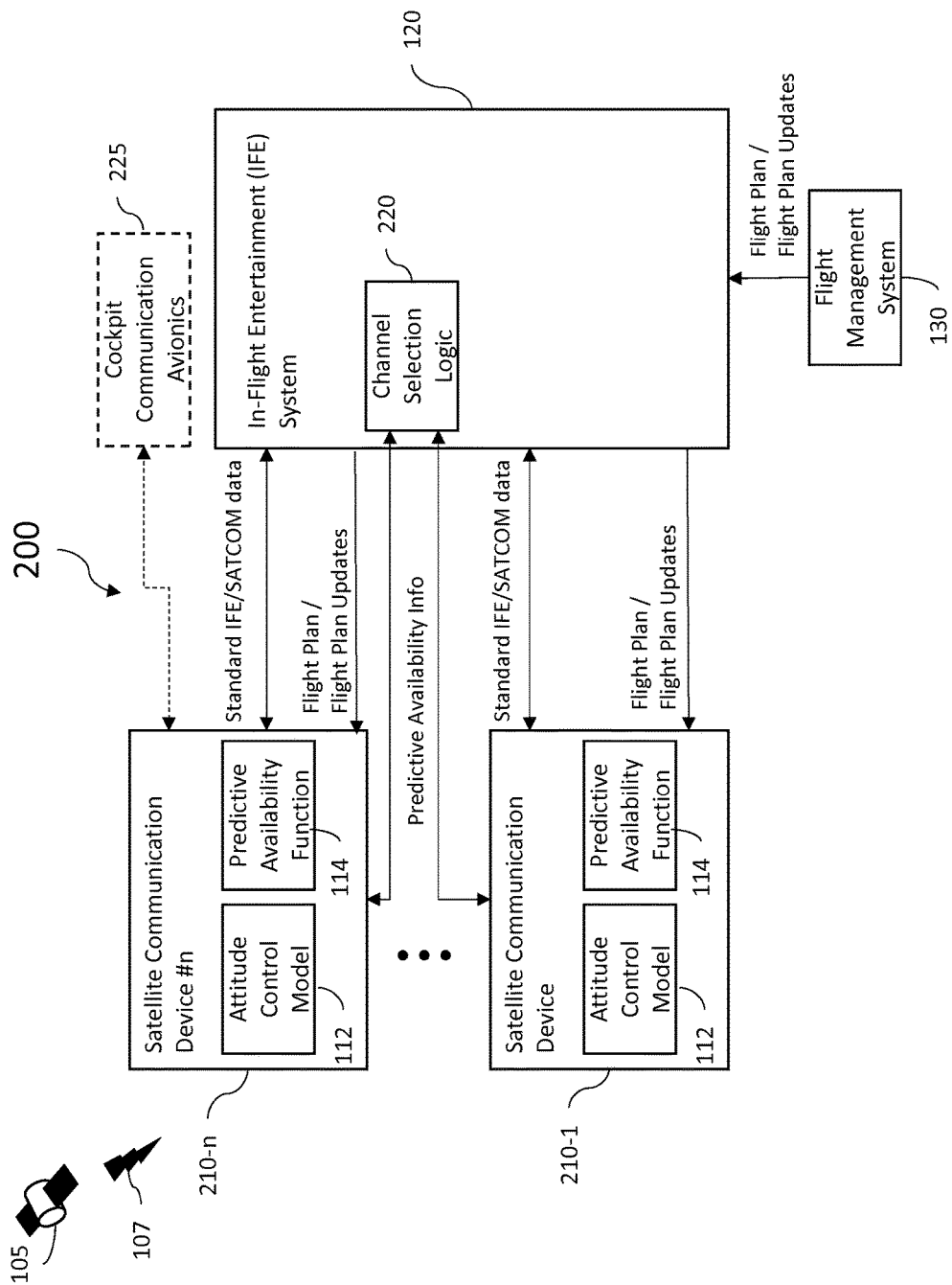
FIG. 2 is a diagram illustrating a communication system of one embodiment of the present disclosure.

In some implementations, such as illustrated in FIG. 2 an aircraft is equipped with more than one satellite communication device enabling communications via different satellite bands and constellations. For example, FIG. 2 is a block diagram illustrating a signal blockage mitigating communications system 200 of another embodiment of the present disclosure comprising a plurality of satellite communication devices (shown at 210-1 to 210-$n$) each of which may be used to establish connectivity between the aircraft and different satellite constellations. It should be understood that each of the plurality of satellite communication devices 210-1 to 210-$n$ may function in the equivalent manner as described for satellite communication device 110, where the description of elements in FIG. 1 may apply to like named elements in FIG. 2 and vise verse. As such, the embodiment of FIG. 2 may be considered an extension of FIG. 1 with the inclusion of additional satellite communication devices and a channel selection logic 220 discussed below.

In one embodiment, system 200 comprises a first satellite communication device 210-1 that is configured to communicate via a first satellite constellation what at least one other satellite communication device 210-$n$ is configured to communicate via a second satellite constellation. This exemplar configuration demonstrates transition improvements for example, for an aircraft equipped with Ka Band SATCOM for cabin service and L Band SATCOM for cockpit service. The system 200 is receiving time correlated flight plan data routed by the in-flight entertainment system 120, with each satellite communication device 210 hosting its own predictive availability function 114. In one embodiment, the satellite communication devices 210-1 to 210-$n$ communicate with onboard in-flight entertainment system 120 by standard protocols, in addition, the predictive availability information from each of the respective predictive availability functions 114 is also carried by standard data buses. The in-flight entertainment system 120 is connected to each of the SATCOM devices providing cabin services, and hosts the channel selection logic 220 which may evaluate and select channels, for example, based on the connection speed, cost, reported availability, reported predictive availability data, and other relevant information. The in-flight entertainment system 120 sends service request to a selected satellite communication device to startup the equipment and initiate the service when necessary. In some implementations, the in-flight entertainment system 120 may connect with other connectivity equipment for example, air-to-ground communications devices or Aero MACS, and the channel selection logic 220 may include all available channels.

For example, in one embodiment, satellite communication device 210-1 provides Ka Band satellite communications for passenger cabin services while the satellite communication devices 210-$n$ may be configured for L Band satellite communications for safety service data links coupled, for example to cockpit avionics 225. When the predictive availability function 114 of satellite communication device 210-1 outputs predictive availability information to the in-flight entertainment system 120 indicating an impending service degradation or loss of all possible channels in its constellation, the channel selection logic 220 may receive that predictive availability information and initiate activation of a data link via satellite communication device 210-$n$ in advance of the predictive outage. As an example, when Ka communication is predicted to be interrupted, the L Band system can start to initiate the communication in advance to get ready for a seamless cabin service transition with minimum or zero connection down time. As mentioned above, the satellite communication devices 210-1 to 210-$n$ may comprise, one or more of, but not limited to, Ka Band, Ka Band, L Band, Iridium systems, or other line-of-sight communication devices.

Figure 3:
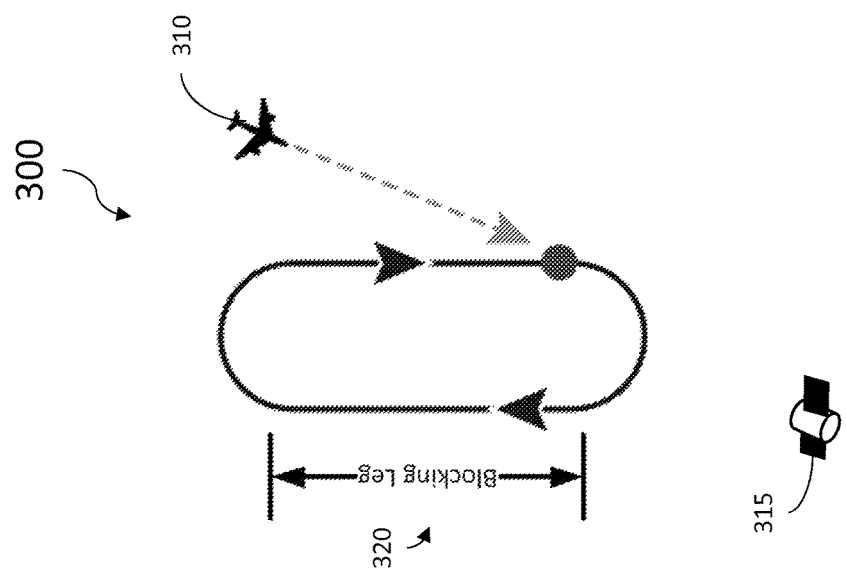
FIG. 3 is a diagram illustrating example operation of a communication system of one embodiment of the present disclosure.

FIG. 3 is a diagram illustrating an operational scenario based on an aircraft that incorporates a signal blockage mitigating communications system such as described above in FIG. 1 or 2. It should be appreciated that substantially similar scenarios are applicable to other vehicles that practice embodiments of the present disclosure, such as but not limited to air, space, ground or sea vehicles.

In FIG. 3, a business jet 310 is cruising over ATN coverage in Europe, the onboard Ka Band SATCOM device is providing network connection in supporting of a teleconference, it currently tracking a satellite 315 at a relatively low elevation angle, and the L Band system is not actively providing service as critical cockpit data is linked through VDL, but a higher angle satellite is available. The flight plan update indicates a high altitude holding pattern is inserted by the flight crew. The predictive availability function 114 of the Ka system is able to detect an empennage blockage during one of its straight legs (shown at 320). As the inserted holding pattern ends up with manual termination, the aircraft may stay in the pattern for multiple 4-minute cycles and results in intermittent signal truncation.

The predictive availability function 114 for the Ka Band SATCOM device thus sends the in-flight entertainment system 120 an indication of unacceptable connectivity performance prediction which will happen in the next 10 minutes, while the L Band's predictive availability function 114 indicates a good prediction. Upon receipt of the indications, the in-flight entertainment system 120 (or particularly the channel selection logic) starts scheduling the data link channel transition, sending annunciation to the cabin crew and passenger for the situation, and requesting service to the L Band system well before the entering the holding pattern.

After the jet enters the pattern, the Ka system degrades in signal due to signal blockage (as predicted by the Ka Band's predictive availability function 114) and the L Band has already been up and running. In one implementation, the meeting attendees may be optionally notified of the potential interrupt. The in-flight entertainment system routes cabin connection to the L Band ports, the ongoing meeting experienced minor glitch and resumed normally instead of suffering 5 minutes of truncation.

Figure 4:
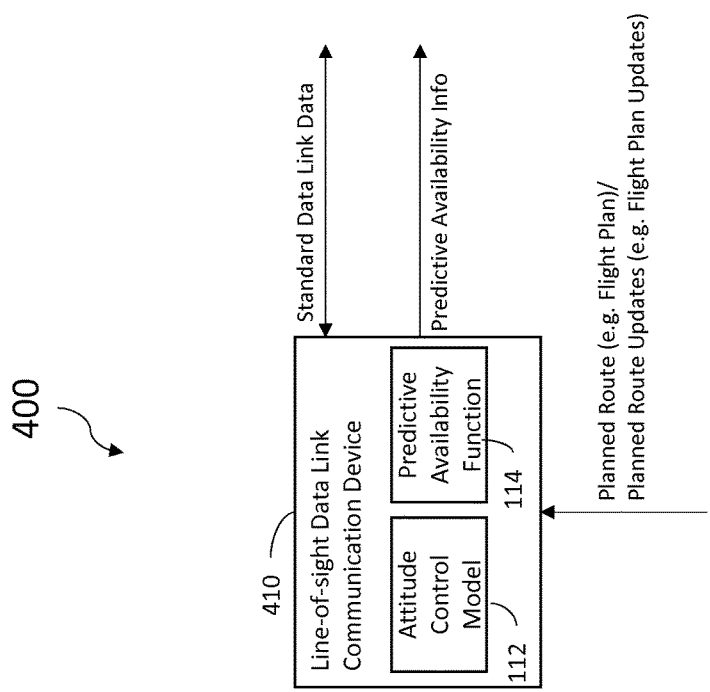
FIG. 4 is a diagram illustrating a communication device of one embodiment of the present disclosure.

As mentioned above, embodiments of this disclosure are not limited to either aircraft or satellite communications but are expressly intended to cover other vehicles that utilize communications technologies that may be degraded when a line-of-sight with a communication source is potentially blocked by components of the vehicles' structure. As such, FIG. 4 provides a generalized description for a line-of-sight data link communication device 410 which may represent any of the communication devices 110, 210-1 to 210-n described above, or implementations for other satellite, non-satellite, air-to-ground, NAVCOM radio, Aero MACS, 3G or 4G cellular, or any other radio communications technology that suffers degradation due to line-of-sight signal blockages, for any air, land, space or sea vehicle. As with the embodiments above, communication device 410 receives time correlated planned route data (which may include route updates) that includes time correlated trajectory data. Given the time correlated trajectory data, the attitude control model 112 generates and outputs a prediction of vehicle attitude for each route segment and trajectory change maneuver defined in the planned route data.

The vehicle attitude data is provided to predictive availability function 114 for the purpose of predicting line-of-sight blockages that will interfere with the connectivity between the vehicle and the communications source in the same manner as described above. In one implementation, the predictive availability function 114 includes a database, table, or some other physical data storage component that stores vehicle specific blockage data. Accordingly, the stored vehicle specific blockage data accessible to the predictive availability function 114 describes the vehicle geometry specific for that vehicle including for example, aircraft structures, and airframe type, and antenna locations on the fuselage. For satellite communication embodiments, in addition to generating a schedule that correlates that vehicles predicted attitude along the planned route, the predictive availability function 114 also includes satellites ephemeris information for each satellite it utilizes and correlates that information for points along the time correlated route plan as well. Given the data provided by the attitude control model 112, the predictive availability function 114 can correlate a blockage schedule that includes predicted vehicle attitudes for various positions (maneuver points and route legs/segments) along the planned route by correlating the predicted vehicle attitudes with the time correlated planned route data. Using these vehicle attitude predictions, the predictive availability function 114 predicts when during the course of travel the orientation of the vehicle will cause some physical component of the vehicle structure to come between the antenna of the communication device 410 and the current position of a given line-of-sight communications source (for example, a particular satellite of constellation 105) causing an interruption in connectivity.

In one embodiment in operation of device 410, the predictive availability function 114 monitors the progress of the vehicle along the planned route path by keeping track of the current elapsed time of travel. Prior to reaching a planned maneuver or route segment where signal blockage of an in-service data link is predicted to occur (e.g., based on the pre-calculated blockage schedule) the predictive availability function 114 initiates establishment of a new data link with a second satellite in constellation 105 that will not have a blocked signal during that period of time. Handoff to the second satellite is performed before connectivity due to the predicted signal blockage is lost. If no alternative connection channel is available or a lower connection speed is expected due to the service transition, the potential connectivity degradation can be well predicted upon the receipt of the planed route or changes to the plan. In one embodiment, the predictive availability function 114 outputs predictive availability information to an on-board system indicating an impending service degradation or loss so that passengers using the services may plan accordingly.

FIG. 5 is a flow chart illustrating a method 500 of one embodiment of the present disclosure. It should be understood that method 500 may be implemented using any one or more of the embodiments described. As such, elements of method 500 may be used in conjunction with, in combination with, or substituted for elements of the embodiments described above either in whole or in part. Further, the functions, structures and other description of elements for such embodiments described above can apply to like named elements of method 500 and vice versa.

The method begins at 510 with receiving time correlated trajectory data for a planned route for a vehicle. At the terms are used herein, the "time correlated trajectory data" for the planned route refers to route plans that specify the path the vehicle is expected to travel in three-dimensional space (heading/track and vertical plan profile data), as well at the points in time at which the vehicle is expected to be at a given waypoint along the path of the planned route. For example, in some implementations, the time correlated planned route comprises a time correlated flight plan that indicates every turn an aircraft is planned to make, and tracks the aircraft's progress along a planned trajectory with altitude and speed constraint and the expected time to a given waypoint. In some aircraft implemented embodiments, the flight plan may be based on a 4D-TBO ("4-Dimensional Trajectory Based Operation") Air Traffic Management (ATM) protocol. In alternate implementations, the vehicle may comprise any air, land, space or sea vehicle.

The method proceeds to 512 with modeling vehicle attitude adjustments based on an attitude control model of the vehicle and trajectory changes identified from the time correlated trajectory data. For example, in one implementation, given the time correlated trajectory data, the attitude control model generates and outputs a prediction of vehicle attitude for each route segment, route segment transition, or other trajectory change maneuver defined in the planned route data.

The method proceeds to 514 with generating a schedule of predicted blockages of line-of-sight communications sources by a structure of the vehicle at a plurality of positions along the planned route of the vehicle based on the vehicle attitude adjustments. The positions along the planned route may comprise periods of time where the aircraft is traversing specific legs or segments of the planned route or periods of trajectory transitions or other planned maneuvers. Given the data provided by the attitude control model, in one embodiment, a predictive availability function correlate a blockage schedule that includes predicted vehicle attitudes for the various points and segments along the planned route by correlating the predicted vehicle attitudes with the time correlated planned route data. Using these vehicle attitude predictions, the predictive availability function predicts when during the course of travel the orientation of the vehicle will cause some physical component of the vehicle structure to come between the antenna of the communication device and the current position of a given line-of-sight communications source (for example, a particular satellite of constellation 105) causing an interruption in connectivity. The line-of-sight communications source may comprise a satellite or satellite constellations, air-to-ground, NAVCOM radio, Aero MACS, 3G or 4G cellular, or any other radio communications technology that suffers degradation due to line-of-sight signal blockages The method proceeds to 516 where when the schedule of predicted blockages indicates that a first line-of-sight communications source will be blocked at first position of the plurality of positions, determining from the schedule if an other line-of-sight communications source is free from predicted blockages at the first position.

The method proceeds to 518 where while travelling along the planned route with the vehicle, prior to a time of reaching the first position of the plurality of positions, either transferring communications from the first line-of-sight communications source to the other line-of-sight communications source, or outputting a signal indicating that communications will be interrupted when the other line-of-sight communications source is not free from predicted blockages at the first position. Signal blockages may thus be predicted by method 500 long before a vehicle maneuver resulting in a signal blockage occurs, thus avoiding or mitigating connectivity truncations and providing an improved experience for users of the connectivity sensitive services.

As mentioned above, predicted signal blockages may be stored in a blockage schedule that is aligned in time with the time correlated flight plan. For flights that require no deviations from their original flight plans, signal blockages may be predicted early, even before the vehicle departure commences, and alternate data link service activations scheduled to avoid or minimize connectivity interruptions. A pre-flight channel selection schedule can be generated and correlated to the time correlated trajectory data based on a blockage schedule well before the vehicle departure. If in-flight deviations are necessary from the original flight plan, signal blockage predictions can be updated by processing the revised correlated flight plan data once the change is confirmed with the aircraft's flight management system. In certain configurations, it is possible to have more than one available communication satellite available for scheduling based on the blockage schedule. As such, the use of a specific satellite can be selected based on desirable signal characteristics. However, a satellite with the best signal quality satellite doesn't necessarily provide the most consistent connectivity. As such, in some embodiments, based on the blockage schedule the method may select satellites based on signals that meet at least a minimum threshold without blockages throughout a given flight segment.

Example Embodiments

Example 1 includes a vehicle communication system, the system comprising: a first radio communication device having a predictive availability function, wherein the predictive availability function comprising an input configured to receive time correlated trajectory data for a planned route for a vehicle; and an attitude control model coupled to the predictive availability function, wherein the attitude control model generates and outputs predictions of vehicle attitude for a plurality of route positions defined along the planned route; wherein the predictive availability function generates a blockage schedule of predicted signal blockages of channels utilized by the first radio communication device based on the predictions of vehicle attitude for the plurality of route positions defined along the planned route; wherein the first radio communication device is configured to transfer between a first communication channel and a second communication channel at a predetermined position along the planned route based on the blockage schedule.

Example 2 includes the system of example 1, wherein the predictive availability function is configured to generate a pre-flight channel selection schedule correlated to the time correlated trajectory data based on the blockage schedule.

Example 3 includes the system of any of examples 1-2, wherein the vehicle is an aircraft, the system further comprising an on-board flight management system outputting the time correlated trajectory data for the planned route.

Example 4 includes the system of any of examples 1-3, the predictive availability function further comprising a memory storing vehicle blockage data that describes a vehicle geometry associated with the vehicle.

Example 5 includes the system of any of examples 1-4, wherein the vehicle comprises either a ground, space or sea vehicle.

Example 6 includes the system of any of examples 1-5, wherein the first radio communication device is a satellite communications device configured to establish at least one data link with a satellite constellation.

Example 7 includes the system of any of examples 1-6, wherein the first radio communication device comprises either an air-to-ground communication device, an Aero MACS device or a cellular communications device.

Example 8 includes the system of any of examples 1-7, further comprising an in-flight entertainment system coupled to the first radio communication device and a flight management system coupled to the in-flight entertainment system, wherein the time correlated trajectory data from the flight management system is provided to the predictive first radio communication device by the in-flight entertainment system.

Example 9 includes the system of any of examples 1-8, further comprising an in-flight entertainment system coupled to the first radio communication device, wherein the predictive availability information notifies the in-flight entertainment system when the blockage schedule indicates that connectivity via the first radio communication device is predicted to be degraded.

Example 10 includes the system of example 9, further comprising: a second radio communication device; and channel selection logic implemented within the in-flight entertainment system; wherein the channel select logic activates the second radio communication device based on the predictive availability information from the first radio communication system and the second radio communication device.

A method for predictive connectivity loss degradation for a vehicle communication system, the method comprising: receiving time correlated trajectory data for a planned route for a vehicle; modeling vehicle attitude adjustments based on an attitude control model of the vehicle and trajectory changes identified from the time correlated trajectory data; generating a schedule of predicted blockages of line-of-sight communications sources by a structure of the vehicle at a plurality of positions along the planned route of the vehicle based on the vehicle attitude adjustments; when the schedule of predicted blockages indicates that a first line-of-sight communications source will be blocked at a first position of the plurality of positions, determining from the schedule if an other line-of-sight communications source is free from predicted blockages at the first position; and while travelling along the planned route with the vehicle, prior to a time of reaching the first position of the plurality of positions, either transferring communications from the first line-of-sight communications source to the other line-of-sight communications source, or outputting a signal indicating that communications will be interrupted when the other line-of-sight communications source is not free from predicted blockages at the first position.

Example 12 includes the method of example 11, wherein the attitude control model is implemented within a radio communication device.

Example 13 includes the method of any of examples 11-12, wherein the vehicle is an aircraft, the method further comprising receiving the time correlated trajectory data from an on-board flight management system.

Example 14 includes the method of any of examples 11-13 wherein generating the schedule of predicted blockages is further based on vehicle blockage data that describes a vehicle geometry associated with the structure of the vehicle.

Example 15 includes the method of any of examples 11-14, wherein the vehicle comprises either a ground, space or sea vehicle.

Example 16 includes the method of any of examples 11-15, wherein the first line-of-sight communication source comprises at least one satellite of a satellite constellation.

Example 17 includes the method of any of examples 11-16, wherein the first line-of-sight communication source comprises either an air-to-ground communication source, an Aero MACS source or a cellular communications source.

Example 18 includes the method of any of examples 11-17, the vehicle further comprising an in-flight entertainment system coupled to a first radio communication device associated with the first link-of-sight communication source and a flight management system coupled to the in-flight entertainment system, wherein the time correlated trajectory data from is generated by the flight management system.

Example 19 includes the method of any of examples 11-18, the vehicle further comprising an in-flight entertainment system coupled to a first radio communication device, wherein based on the schedule of predicted blockages, the method further comprises: communicating predictive availability information to the in-flight entertainment system when the blockage schedule indicates that connectivity via the first radio communication device is predicted to be degraded.

Example 20 includes the method of example 19, the vehicle further comprising: a second radio communication device; and channel selection logic implemented within the in-flight entertainment system; wherein the channel select logic activates the second radio communication device based on the predictive availability information from the first radio communication system and the second radio communication device.

In various alternative embodiments, system elements, method steps, or examples described throughout this disclosure (such as the attitude control models, predictive availability functions channel selection logic, in-flight entertainment system, satellite communications device, or sub-parts thereof, for example) may be implemented using one or more computer systems, field programmable gate arrays (FPGAs), or similar devices comprising a processor coupled to a memory and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A vehicle communication system, the system comprising:
   a first radio communication device having a predictive availability function, wherein the predictive availability function comprising an input configured to receive time correlated trajectory data for a planned route for a vehicle; and
   an attitude control model coupled to the predictive availability function, wherein the attitude control model generates and outputs predictions of vehicle attitude for a plurality of route positions defined along the planned route;
   wherein the predictive availability function generates a blockage schedule of predicted signal blockages of channels utilized by the first radio communication device based on the predictions of vehicle attitude for the plurality of route positions defined along the planned route;
   wherein the first radio communication device is configured to transfer between a first communication channel and a second communication channel at a predetermined position along the planned route based on the blockage schedule.

2. The system of claim 1, wherein the predictive availability function is configured to generate a pre-flight channel selection schedule correlated to the time correlated trajectory data based on the blockage schedule.

3. The system of claim 1, wherein the vehicle is an aircraft, the system further comprising an on-board flight management system outputting the time correlated trajectory data for the planned route.

4. The system of claim 1, the predictive availability function further comprising a memory storing vehicle blockage data that describes a vehicle geometry associated with the vehicle.

5. The system of claim 1, wherein the vehicle comprises either a ground, space or sea vehicle.

6. The system of claim 1, wherein the first radio communication device is a satellite communications device configured to establish at least one data link with a satellite constellation.

7. The system of claim 1, wherein the first radio communication device comprises either an air-to-ground communication device, an Aero MACS device or a cellular communications device.

8. The system of claim 1, further comprising an in-flight entertainment system coupled to the first radio communication device and a flight management system coupled to the in-flight entertainment system, wherein the time correlated trajectory data from the flight management system is provided to the predictive first radio communication device by the in-flight entertainment system.

9. The system of claim 1, further comprising an in-flight entertainment system coupled to the first radio communication device, wherein the predictive availability information notifies the in-flight entertainment system when the blockage schedule indicates that connectivity via the first radio communication device is predicted to be degraded.

10. The system of claim 9, further comprising:
a second radio communication device; and
channel selection logic implemented within the in-flight entertainment system;
wherein the channel select logic activates the second radio communication device based on the predictive availability information from the first radio communication system and the second radio communication device.

11. A method for predictive connectivity loss degradation for a vehicle communication system, the method comprising:
receiving time correlated trajectory data for a planned route for a vehicle;
modeling vehicle attitude adjustments based on an attitude control model of the vehicle and trajectory changes identified from the time correlated trajectory data;
generating a schedule of predicted blockages of line-of-sight communications sources by a structure of the vehicle at a plurality of positions along the planned route of the vehicle based on the vehicle attitude adjustments;
when the schedule of predicted blockages indicates that a first line-of-sight communications source will be blocked at a first position of the plurality of positions, determining from the schedule if an other line-of-sight communications source is free from predicted blockages at the first position; and
while travelling along the planned route with the vehicle, prior to a time of reaching the first position of the plurality of positions, either transferring communications from the first line-of-sight communications source to the other line-of-sight communications source, or outputting a signal indicating that communications will be interrupted when the other line-of-sight communications source is not free from predicted blockages at the first position.

12. The method of claim 11, wherein the attitude control model is implemented within a radio communication device.

13. The method claim 11, wherein the vehicle is an aircraft, the method further comprising receiving the time correlated trajectory data from an on-board flight management system.

14. The method of claim 11 wherein generating the schedule of predicted blockages is further based on vehicle blockage data that describes a vehicle geometry associated with the structure of the vehicle.

15. The method of claim 11, wherein the vehicle comprises either a ground, space or sea vehicle.

16. The method of claim 11, wherein the first line-of-sight communication source comprises at least one satellite of a satellite constellation.

17. The method of claim 11, wherein the first line-of-sight communication source comprises either an air-to-ground communication source, an Aero MACS source or a cellular communications source.

18. The method of claim 11, the vehicle further comprising an in-flight entertainment system coupled to a first radio communication device associated with the first link-of-sight communication source and a flight management system coupled to the in-flight entertainment system, wherein the time correlated trajectory data from is generated by the flight management system.

19. The method of claim 11, the vehicle further comprising an in-flight entertainment system coupled to a first radio communication device, wherein based on the schedule of predicted blockages, the method further comprises:
communicating predictive availability information to the in-flight entertainment system when the blockage schedule indicates that connectivity via the first radio communication device is predicted to be degraded.

20. The method of claim 19, the vehicle further comprising:
a second radio communication device; and
channel selection logic implemented within the in-flight entertainment system;
wherein the channel select logic activates the second radio communication device based on the predictive availability information from the first radio communication system and the second radio communication device.

* * * * *